US007743497B2

(12) United States Patent
Gautreau et al.

(10) Patent No.: US 7,743,497 B2
(45) Date of Patent: Jun. 29, 2010

(54) METHOD OF PROVIDING NON-UNIFORM STATOR VANE SPACING IN A COMPRESSOR

(75) Inventors: James C. Gautreau, Greenville, SC (US); Stephen P. Wassynger, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1100 days.

(21) Appl. No.: 11/244,372

(22) Filed: Oct. 6, 2005

(65) Prior Publication Data

US 2007/0079506 A1 Apr. 12, 2007

(51) Int. Cl.
*B23P 6/00* (2006.01)

(52) U.S. Cl. .............. 29/888.021; 29/889.1; 29/889.21; 29/402.08; 29/402.09

(58) Field of Classification Search ................ 29/401.1, 29/402.01, 402.03, 402.08, 402.09, 402.12, 29/402.14, 889.1, 889.21, 888.021
See application file for complete search history.

(56) References Cited

U.S. PATENT DOCUMENTS 3,006,603 A * 10/1961 Caruso et al. ............... 415/195
3,194,487 A * 7/1965 Tyler et al. ..................... 415/1
3,849,023 A 11/1974 Klompas
3,918,832 A * 11/1975 Shuttleworth et al. .... 415/209.3
4,135,857 A * 1/1979 Pannone et al. ......... 416/193 A
4,193,568 A * 3/1980 Heuvel ..................... 244/23 C
4,967,550 A * 11/1990 Acton et al. .................. 60/794
5,141,391 A * 8/1992 Acton et al. ................ 415/119
5,340,271 A * 8/1994 Freeman et al. ................ 415/1
5,690,469 A * 11/1997 Deal et al. .................. 415/189
5,765,993 A * 6/1998 Weiss ...................... 415/209.2
6,416,278 B1 * 7/2002 Caddell et al. .............. 415/191
6,543,997 B2 * 4/2003 Donnaruma et al. ...... 415/208.1
6,752,589 B2 * 6/2004 Vogan et al. ................ 415/103
6,869,270 B2 * 3/2005 Bunker et al. ............. 416/97 R
6,905,303 B2 * 6/2005 Liu et al. .................... 415/142
6,984,108 B2 * 1/2006 Anderson et al. ........ 415/209.3
7,097,420 B2 * 8/2006 Cormier et al. ............. 415/119
7,234,914 B2 * 6/2007 Usab et al. ...................... 415/1
7,434,313 B2 * 10/2008 Dasilva et al. ............. 29/889.1

(Continued)

FOREIGN PATENT DOCUMENTS

CN 1576611 2/2005
EP 1772596 A2 * 4/2007
JP 2007100700 A * 4/2007

OTHER PUBLICATIONS

Chinese Office Action dated Apr. 10, 2009.

*Primary Examiner*—Essama Omgba
(74) *Attorney, Agent, or Firm*—Nixon & Vanderhye, P.C.

(57) ABSTRACT

Stator blade counts of an upper compressor casing for adjacent stages S0 and S1 are changed in the field to provide additional stator vanes and hence an increased vane count. Particularly, the upper casing half of the compressor is removed from the lower casing half. The original stator vanes on opposite axial sides of the first stage buckets are removed from the upper casing half and replaced by an additional sets of stator vanes providing a non-uniform vane spacing as between the upper and lower halves of the compressor as well as between axially adjacent stages S0 and S1. The unequal vane counts reduce the vibratory response of the rotating blades between stages S0 and S1.

7 Claims, 3 Drawing Sheets

U.S. PATENT DOCUMENTS

| | | | | |
|---|---|---|---|---|
| 7,458,219 | B2 * | 12/2008 | Herzog et al. | 60/653 |
| 2005/0191177 | A1 * | 9/2005 | Anderson et al. | 415/209.3 |
| 2006/0045772 | A1 * | 3/2006 | Slovisky et al. | 417/423.1 |
| 2006/0198726 | A1 * | 9/2006 | Schirle et al. | 415/119 |
| 2007/0077148 | A1 * | 4/2007 | Bird | 416/223 R |
| 2007/0079506 | A1 * | 4/2007 | Gautreau et al. | 29/888.021 |
| 2007/0231155 | A1 * | 10/2007 | Burdgick et al. | 416/231 R |
| 2008/0282541 | A1 * | 11/2008 | Anderson et al. | 29/888.025 |

* cited by examiner (PRIIOR ART)

METHOD OF PROVIDING NON-UNIFORM STATOR VANE SPACING IN A COMPRESSOR

The present invention relates to non-uniform stator vane spacing in a compressor and particularly relates to non-uniform blade counts of stator vanes in the upper and lower compressor casing halves of a compressor stage to minimize or eliminate vibratory response of adjacent rotating blades.

BACKGROUND OF THE INVENTION

In axial flow compressors, stator vanes alternate with rotating blades or buckets in the various stages of the compressor. The stator vanes are circumferentially spaced one from the other about the compressor axis and are secured to the upper and lower compressor casing halves. The upper and lower casing halves are joined one to the other at the compressor midline and provide a complete circumferential array of stator vanes for each compressor stage. As each rotating blade mounted on the rotor completes each revolution at a given rotational velocity, the rotating blade receives aerodynamic excitation pulses from each stator vane. This pulse can be generated from the wake of the upstream stator vane or the bow wave of the downstream stator vane. It is also possible to generate excitations in the rotating blade from differences between the upstream and downstream stator vane counts. These pulses induce a vibratory response in the rotating blade which can be deleterious to the rotating blade causing failure due to high cycle fatigue.

Typically the stator vane or blade count in the upper and lower halves of the compressor casing for a given stage are equal in number to one another. For example, in an initial stage S0 of a given compressor, the blade count for the stator vanes in each of the upper and lower compressor casing halves is 24/24. In the next stage S1, the blade count is 22/22. The first number represents the number of stator vanes in the upper casing half and the second number represents the number of stator vanes in the lower casing half of the same stage. The total stator vane count in S0 and S1 is therefore forty-eight and forty-four stator vanes respectively. However, because of the vibratory responses of the rotating blades, non-uniform vane spacings between upper and lower casing halves have been used in the past. Thus, different and alternative upper and lower blade counts in succeeding stages have been provided to reduce or eliminate the vibratory response. For example, in one compressor, stages S0 and S1 have had vane counts of 24/23 and 23/24, respectively. These non-uniform blade counts have been used in original equipment manufacture.

There are, however, a significant number of compressors in use in the field where there is an equal number of stator vanes in the upper and lower compressor halves for given stages. Certain other compressors in the field have an unequal number of stator vanes in the upper and lower compressor halves with adjacent stages, e.g. S0 and S1, having equal numbers of blades but alternate blade counts between the upper and lower halves of the compressor casing. Changing blade counts in the field was not previously considered practical since costly removal of the rotor in the field was required. Consequently there developed a need to retrofit compressors in the field with non-uniform blade counts among upper and lower compressor halves of the same stage to reduce vibratory response and without the necessity of removing the rotor.

BRIEF DESCRIPTION OF THE INVENTION

In accordance with a preferred aspect of the present invention, there is provided a method of installing stator vanes in the field which enables a change of blade counts in the upper half of the compressor casing permitting compressors in situ or in the field to be upgraded to compressors with non-uniform upper and lower compressor casing blade counts to reduce the vibratory response of the rotating blades. For example, for a particular compressor in the field with a given count of stator vanes, the adjacent stator stages in the upper half of the compressor casing are provided increased stator blade counts, e.g., 26/23 for S0 and 24/23 for S1 yielding blade counts of forty-nine for the S0 stator vanes and forty-seven for the S1 stator vanes. Consequently, only the upper half of the compressor casing requires removal in the field to alter the stator vane count while the same number of stator blades in the lower compressor half for each stage is maintained. Significant advantage accrues to this alteration in stator vane count since removal of the rotor and access to the lower casing half are not required to alter the blade count. By altering only the count of stator vane blades in the upper compressor half, and changing the blade count of adjacent stator stages, the rotating blades cannot lock into a synchronous vibratory response and consequent high cycle fatigue is minimized or avoided.

In a preferred embodiment hereof, there is provided a method of retrofitting a compressor comprising the steps of (a) removing an upper half of the compressor casing in situ to open the compressor; (b) removing a first set of stator vanes of the array thereof having a first blade count from the removed upper half of the removed compressor casing; (c) in place of the removed first set of stator vanes, installing in the removed upper half of the compressor casing a second set of vanes with a second vane count different than the vane count of the first set of stator vanes; and (d) closing the compressor by securing the upper half of the compressor casing with the second set of vanes to the lower half of the compressor casing. Preferably, the compressor is retrofitted in situ to reduce vibratory response of one set of rotating compressor buckets to aerodynamic excitation pulses generated by at least one array of stator vanes adjacent to the one set of rotating compressor buckets.

DETAILED DESCRIPTION OF THE INVENTION

Figure 1:
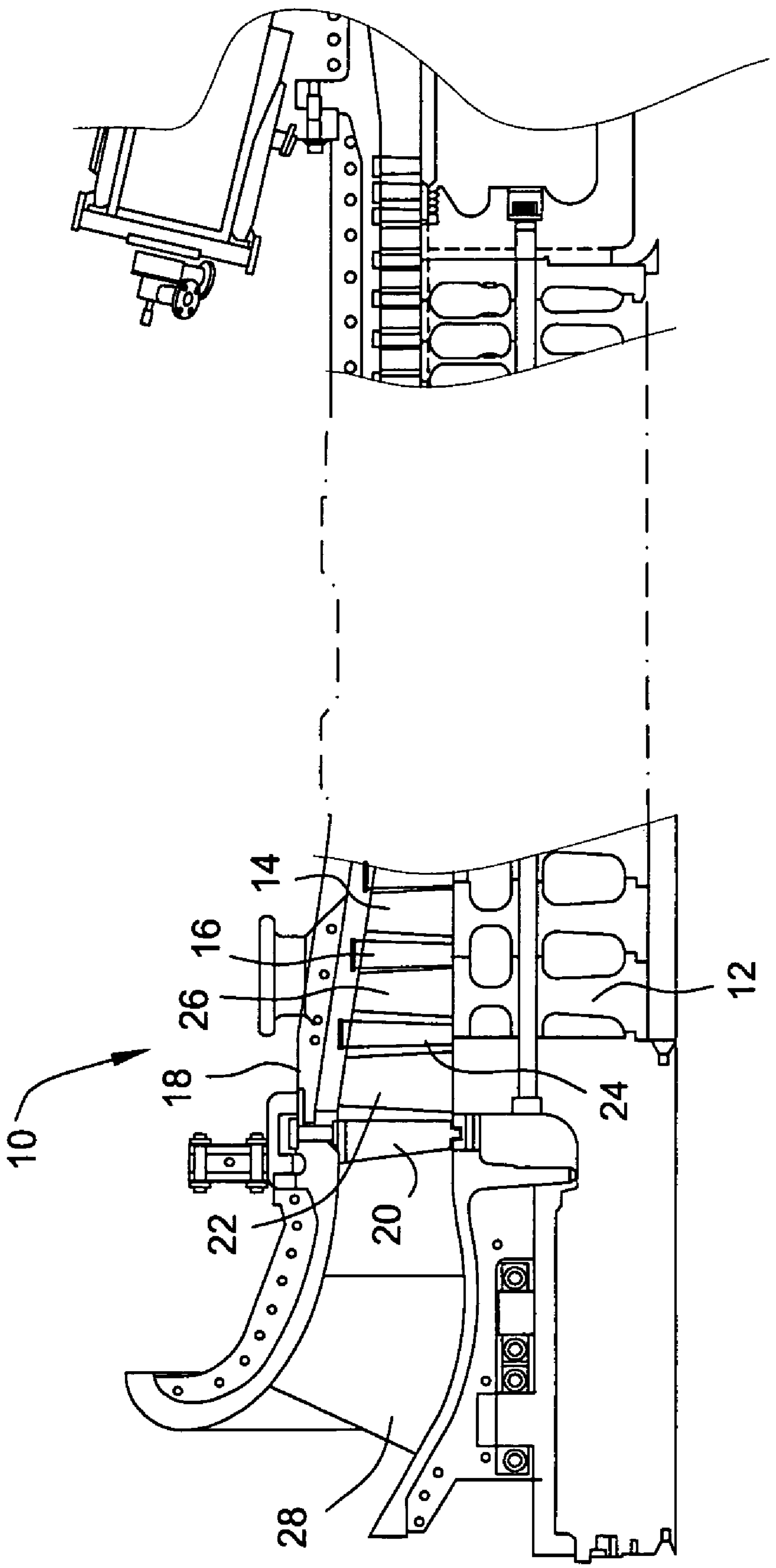
FIG. 1 is a schematic illustration with parts broken out for clarity of the upper half of a compressor illustrating various compressor stages.

Referring to FIG. 1, there is illustrated an upper half of a compressor generally designated 10. Compressor 10 includes a rotor 12 mounting buckets or blades 14 for rotation about the axis of the compressor and stator vanes 16 fixed to the upper casing half 18. It will be appreciated that the vanes 14 of the rotor are circumferentially spaced one from the other about the rotor axis and that the stator vanes 16 are similarly circumferentially spaced one from the other about the axis. The vanes and buckets form various stages of the compressor. For example, the vanes 20 and buckets 22 form compressor stage S0 while the vanes 24 and buckets 26 form stage S1. Inlet guide vanes 28 are also illustrated in FIG. 1.

Figure 2:
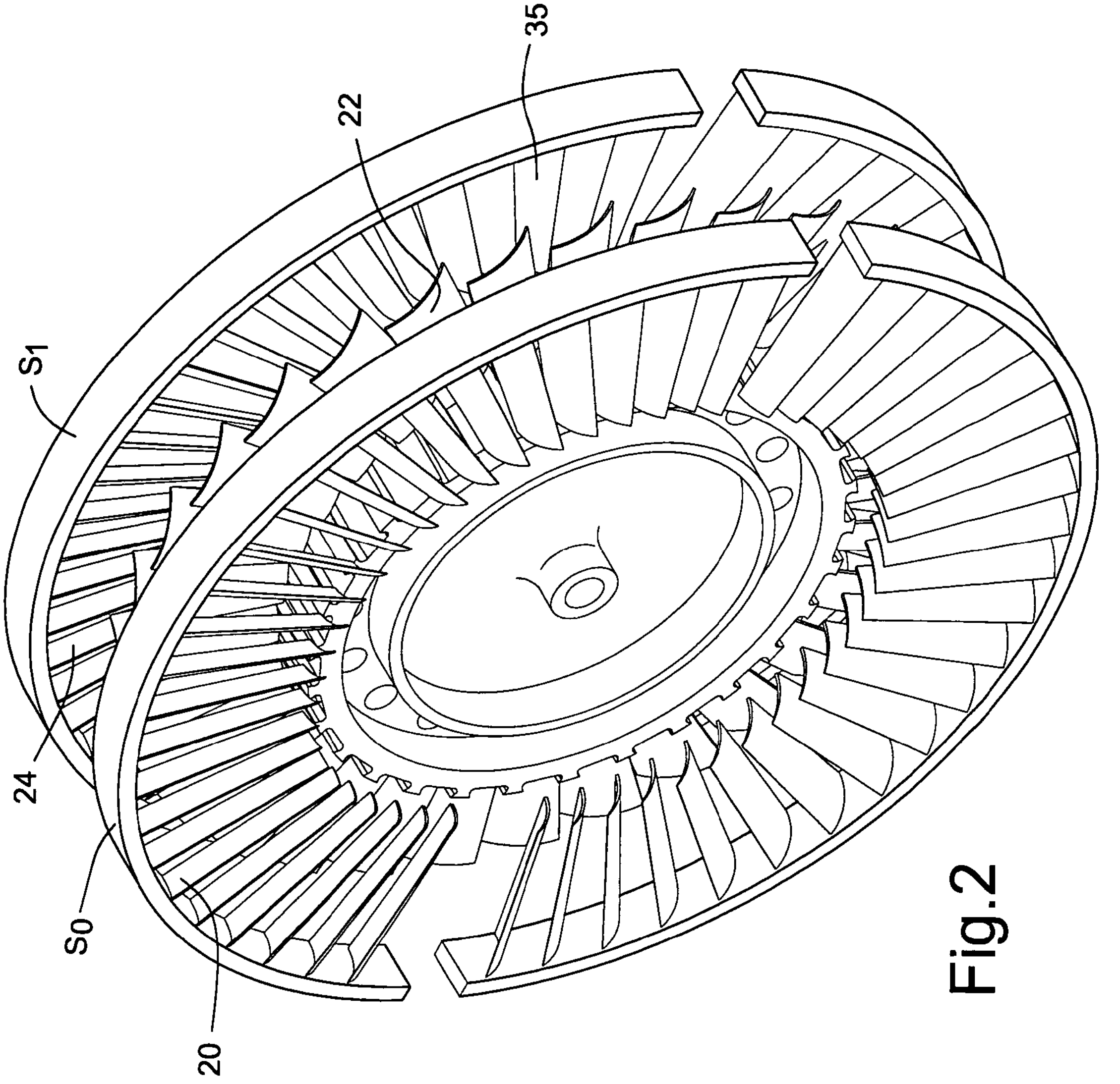
FIG. 2 is a perspective view of stage S0 and stage S1 with rotating blades or buckets therebetween illustrating the different blade counts in the upper and lower compressor halves of these stages.

Referring to FIG. 2, there is schematically illustrated the stator vanes 20 of stage S0 and the stator vanes 24 of stage S1. The buckets 22 mounted on the rotor 12 are illustrated disposed between the stator vanes 20 and 24. The stator vanes 20 and 24 as well as stator vanes of other stages are typically attached to the upper and lower casing halves, schematically illustrated at 30 and 32 respectively in FIGS. 3 and 4. As well known, the upper and lower halves of the compressor casing are secured at the horizontal midline to one another by bolted flanges 34 which enable the upper half 30 of the casing to be removed from the lower half 32 with the rotor retained in the lower half. The upper and lower halves of the stator vanes 20 and 24 illustrated in FIG. 2 are shown separated from one another for clarity.

Figure 3:
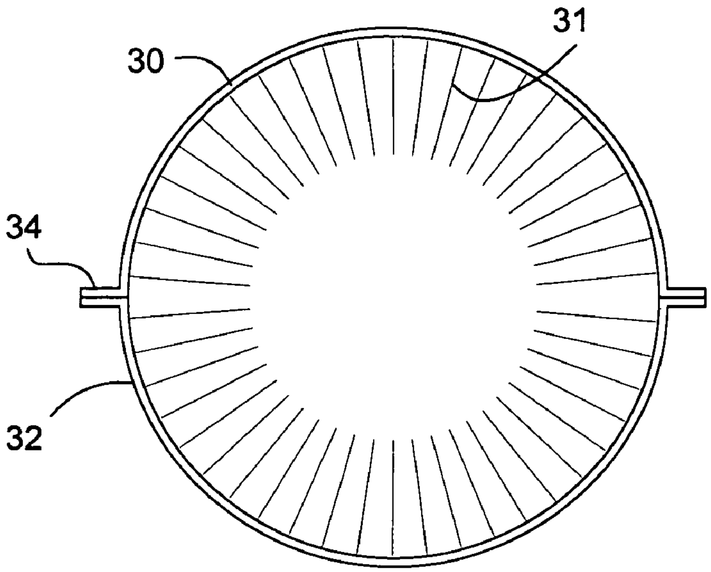
FIG. 3 is a schematic end view illustrating a compressor having an equal stator vane count in both upper and lower halves of the compressor stage.

In the prior compressor stator vane arrangement illustrated in FIG. 3, the upper and lower compressor halves each mount an equal number or count of stator vanes. In this illustration, each of the upper and lower halves contained twenty-three stator vanes. To reduce the vibratory response of the buckets or vanes mounted on the rotor due to excitation from the flow pulses from the upstream and the downstream stator vanes, an aspect of the present invention provides for replacement of the stator vanes solely in the upper half of the compressor casing with an additional number of vanes to provide an unequal number of vanes in the upper and lower halves of the compressor casing respectively. Additionally, the second stage S1 is similarly provided with an unequal count of stator vanes between the upper and lower halves. In both cases, the upper half of the compressor casing is retrofitted in situ, i.e., in the field to provide the additional number of stator vanes without removal of the rotor from the lower casing half.

Figure 4:
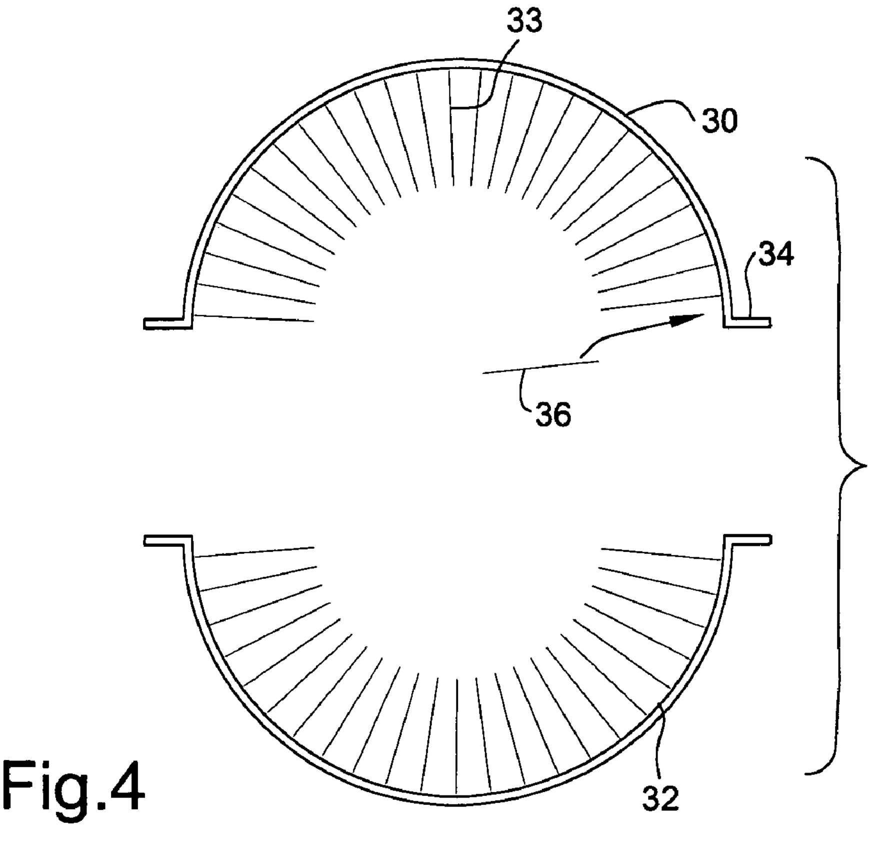
FIG. 4 is a schematic illustration of the removal of the upper compressor half and a change in the blade count in the removed upper half.

The installation procedure is schematically illustrated in FIG. 4. First, the upper half of the casing is removed thereby gaining access to the stator vanes carried by the upper compressor half. The original first set 31 of stator vanes of the original array thereof having a first blade count are then removed from the removed upper half of the compressor casing. The number of stator vanes in the upper half of the casing is preferably increased, for example to twenty-six vanes rather than the original twenty-three vanes. Thus, a second set 33 of stator vanes is installed in the removed upper half of the casing. In the schematic illustration of FIG. 4, the final stator vane 36 is shown being installed in the upper half of the compressor casing whereby the upper half of the casing now carries a second set 33 of twenty-six stator vanes (rather than the original twenty-three stator vanes) and the lower half 23 continues to carry the original twenty-three stator vanes. It will be appreciated that the removal of the upper casing half to add additional stator vanes does not require the removal of the rotor from the lower casing half. This enables the compressor to be modified in the field or in situ.

It will also be appreciated that the stage S1 stator vanes are altered in their count. Preferably, the third set of original stator vanes of stage S1 are changed to provide a fourth set 35 of twenty-four stator vanes in the removed upper casing half while retaining the original twenty-three stator vanes in the lower casing half. As a consequence of the foregoing, stage S0 after modification has a blade count of 26/23 for a total blade count of forty-nine blades while stage S1 has a blade count of 24/23 for a total count of forty-seven blades. The unequal blade counts in the upper and lower casing halves and the adjacency of the stages S0 and S1 reduce the vibratory response of the buckets or vanes 22 of the rotor. Additionally, the blade counts of forty-nine and forty-seven were selected based on the fact that they were prime or near prime numbers and that they are not whole order of multiples of typical engine order excitations, 2/revolutions, 3/revolutions and 4/revolutions. This typically comes from the shape of the air at the inlet. Engine air typically has a large content of these engine orders. By using prime numbers, harmonics of these excitation orders are avoided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of retrofitting a compressor comprising the steps of:

(a) removing an upper half of the compressor casing in situ to open the compressor;

(b) removing a first set of stator vanes of an array thereof having a first blade count from the removed upper half of the compressor casing;

(c) in place of the removed first set of stator vanes, installing in the removed upper half of the compressor casing a second set of stator vanes with a second vane count different than the vane count of said first set of stator vanes, while maintaining without change, all original stator vanes in a lower half of the compressor casing; and (d) closing the compressor by securing the upper half of the compressor casing with the second set of stator vanes to the lower half of the compressor casing.

2. A method according to claim 1 wherein step (b) includes removing from the removed upper half of the compressor casing a third set of stator vanes of another array thereof and on an opposite axial side of the rotating compressor blading from said one array of stator vanes; and, in place of the removed third set of stator vanes, installing in the removed upper half of the compressor casing a fourth set of stator vanes with a blade count different than the blade count of the third set of stator vanes.

3. A method according to claim 1 wherein step (c) includes installing the second set of stator vanes in the removed upper half of the compressor casing with a blade count greater than the blade count of the stator vanes of a corresponding lower compressor casing half of the same compressor stage.

4. A method according to claim 3 wherein the second set of stator vanes has twenty-six vanes and the corresponding lower half of stator vanes has twenty-three vanes.

5. A method according to claim 1 wherein step (b) includes removing from the removed upper half of the compressor casing a third set of stator vanes of another array thereof and on an opposite axial side of the rotating compressor blading from said one array of stator vanes; and, in place of the removed third set of stator vanes, installing in the removed upper half of the compressor casing a fourth set of stator vanes with a blade count greater than the blade count of the stator vanes of a corresponding lower compressor casing half of the same compressor stage.

6. A method according to claim 5 wherein the fourth set of vanes has twenty-four vanes and the corresponding lower half of stator vanes has twenty-three vanes.

7. A method according to claim 1 wherein steps (a)-(d) are performed to reduce the vibratory response of one set of rotating compressor buckets to aerodynamic excitation pulses generated by at least one array of stator vanes adjacent to the one set of rotating compressor buckets.

* * * * *